Nov. 17, 1925.  1,562,177
L. C. LAZEAR ET AL
STEERING WHEEL LOCK
Filed May 23, 1921  3 Sheets-Sheet 2

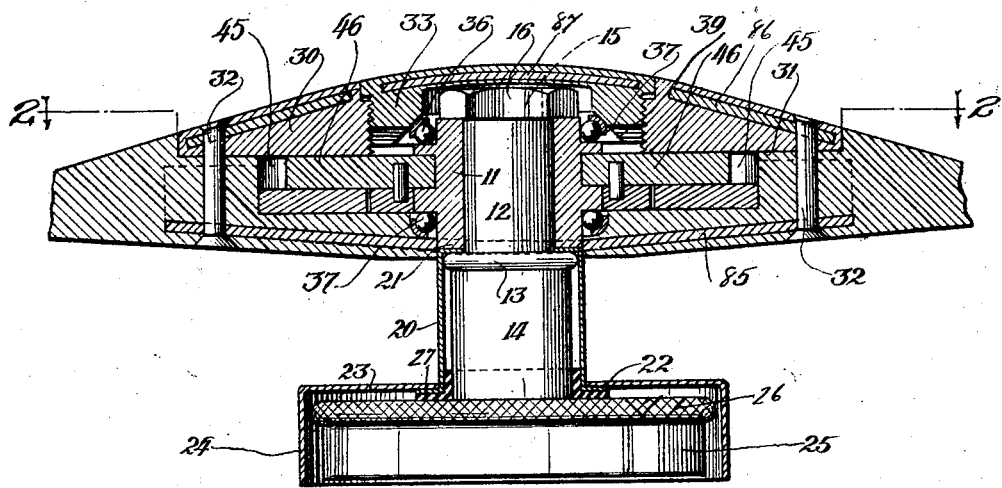
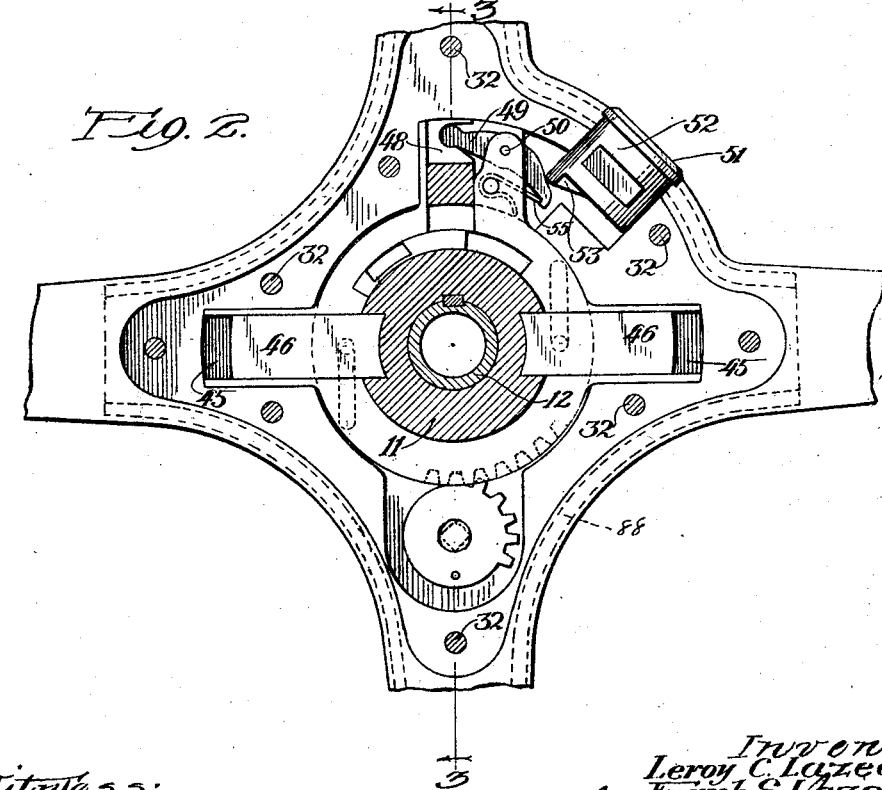

Nov. 17, 1925.

L. C. LAZEAR ET AL 1,562,177

STEERING WHEEL LOCK

Filed May 23, 1921   3 Sheets-Sheet 3

Witness:
Stephen J. Rebna

Inventors
Leroy C. Lazear.
Frank S. Lazear.

Patented Nov. 17, 1925.

1,562,177

UNITED STATES PATENT OFFICE.

LEROY C. LAZEAR AND FRANK S. LAZEAR, OF CHICAGO, ILLINOIS.

STEERING-WHEEL LOCK.

Application filed May 23, 1921. Serial No. 471,783.

*To all whom it may concern:*

Be it known that we, LEROY C. LAZEAR and FRANK S. LAZEAR, both citizens of the United States, residing at Chicago, in the county of Cook and State of Illinois, have invented certain new and useful Improvements in Steering-Wheel Locks, of which the following is a specification.

The present invention has to do with steering wheels for automobiles, motor boats, etc., and is particularly concerned with means for interlocking the wheel to the post having connection with a steering apparatus, and with means by which this interlocking connection may be disestablished to render the steering wheel inoperative; more particularly the present wheel is adapted to Ford cars, although its use need not be restricted to such application.

Various forms of steering wheel locks for automobiles and the like have heretofore been devised, usually involving the attachment of certain unsightly parts to the steering wheel or to the post upon which it is mounted. Such steering wheel locks, furthermore, are relatively complicated and oftentimes ineffectual, in that they perform inadequately their intended functions. In addition to the disadvantages just mentioned, it is usually not difficult for an unauthorized person to pick or tamper with the locks so provided, in consequence of which no real protection is afforded.

Our improved steering wheel provides a connection with the post which is entirely concealed, so that the wheel remains substantially the same in appearance as others commonly in use; it includes means, however, by which the wheel may be readily rendered operative or inoperative as desired. It is furthermore simple and positive in its action, and retains within its own body practically all the operative elements necessary to effect the desired locking and unlocking actions, so that it is practically immune from tampering. These and other objects of our invention will more fully hereinafter appear from the specification and claims to follow, and from the accompanying drawings in which—

Figure 1 is a vertical section through the central portion of a steering wheel constructed in accordance with our invention;

Fig. 2 is a horizontal section therethrough taken on line 2—2 of Fig. 1, the parts being related as when moved to locking position;

Figure 3:
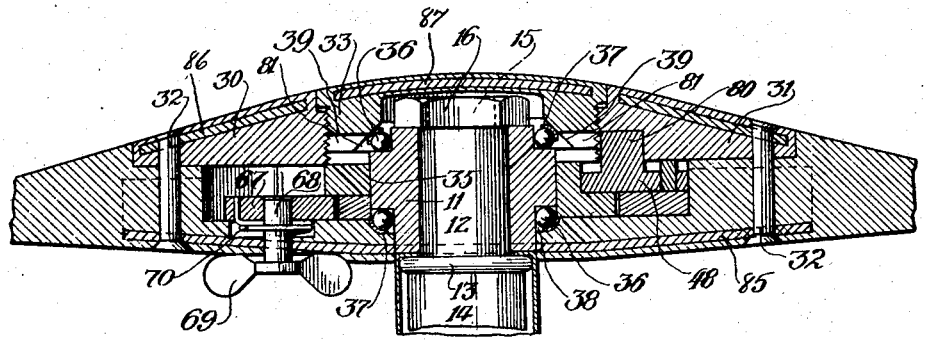
Fig. 3 is a sectional view similar to Fig. 1, taken through a plane which is right angular thereto.
Figure 4:
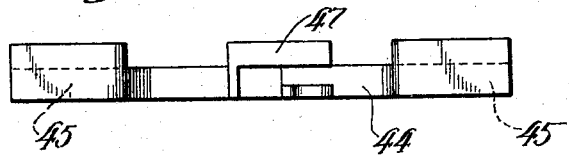
Fig. 4 is a side elevation of the guide frame within which the locking parts move radially.

Inasmuch as the parts special to this invention are located centrally of the wheel, we have deemed it sufficient to illustrate only this portion. Accordingly there is shown the inner ends of the wheel spokes, which may conveniently be four in number, and which extend outwardly as far as desired to support a circular rim (not shown). The wheel is adapted for operative connection with a hub 11 that is made fast to the upper end of the steering post 12 which, in the form shown in Figs. 1 and 3, follows the construction that is used with automobiles of the Ford make. On the end of such a post is a threaded extremity 15 of reduced diameter adapted to receive thereon a lock nut 16. The hub 11 which is arranged to fit upon a post so formed is connected nonrotatably therewith by any suitable means which we do not deem necessary to illustrate.

Associated with the upper end of the steering post is a box 25 from whose cover 26 extends upwardly a neck 14 whose upper end is rounded as at 13 to form a shoulder.

Resting upon the shoulder is a flange 21 that lies also beneath the hub 11, this flange constituting the upper end of a sleeve 20 whose lower end is outturned to provide another flange 22 upon which may be mounted a cap 23 whose downwardly depending walls 24 overlie the box 25 within which are contained the planetary gears which form part of the Ford steering mechanism. To cushion the parts against rattle a gasket 27 may be interposed between the sleeve and cap and the neck and cover, as shown in Fig. 1. By virtue of the arrangement described, the lock nut 16 and hub 11 co-operate with the sleeve 20 to prevent access to the gear box or its removal from the post.

It will be noted that the several spokes of the wheel are merged into its central portion which is hollowed to receive the hub and the various locking elements that co-operate therewith. This space in the wheel center opens onto its upper side to facilitate its manufacture and the assembly of the locking parts, and may be closed by means of a ring plate 30 which is adapted to rest upon a seat 31 formed by shouldering the walls surrounding the space that is provided centrally within the wheel. As by means of rivets 32 this plate 30 is secured permanently in place. The ring plate is centrally apertured and provided with threads to receive a cap nut 33 which overlies the lock nut 16.

According to the construction shown (Fig. 3) there is formed on the hub 11 an enlarged head 35 which occupies a position centrally of the wheel as viewed from its upper and lower sides. The shoulders adjacent this head provide a raceway for balls 36 which are carried in annular retainers 37, one above and the other below the head. The lower retainer is adapted to rest within a seat 38 formed in the walls of the wheel, while the upper retainer is engaged by an appropriately formed wall 39 which is formed on the cap nut 33. When the nut is screwed to the desired position, this wall 39 will exert pressure upon the balls such as to prevent rocking of the wheel upon the post without impairing its rotary movements thereupon.

Figure 5:
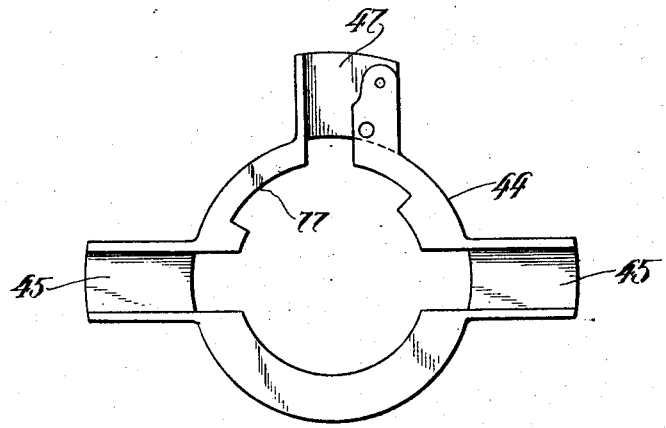
Fig. 5 is a plan view thereof.

The means thus far described provide a mounting for the wheel such that it may be freely revolved upon the post, but without the possibility of removal therefrom, unless the cap and lock nuts be first taken off. The mechanism by which the wheel effects an interlock with the steering post, through the medium of the hub 11 which is immovably secured thereto, will now be described in detail. Preferably this includes a guide frame 44 such as is shown in Fig. 5 having a circular portion which is adapted to surround the hub head and from which extend on diametrically opposite sides walls which form radial guideways 45 within each of which is mounted a slidable locking bolt 46 (see Figs. 2 and 6). A third radial guideway 47 is also provided being disposed about midway between the other two, and by preference the walls of the wheel adjacent the frame are formed to provide a seat within which the frame may lie without movement. Within the guideway 47 is arranged a slide bolt 48 provided with actuating means therefor which, according to the construction shown, consists of a lever 49 connected therewith and pivoted as at 50 to the ring frame 44, a spring 55 being provided and so arranged as normally to urge the slide bolt 48 inwardly toward the center of the wheel. This lever may, however, be used to retract the slide bolt, and to assist in this action, we have provided a key-controlled lock 51 containing the usual rotatable cylinder 52 at the rear end of which is a circular cam 53 that is adapted to bear upon the lever so as to cause its retraction against the tension of the spring 50 to thereby shift the slide bolt 48 away from the center of the wheel. These movements are controlled solely through the medium of a proper key which can operate only when inserted in the lock so provided.

Figure 6:
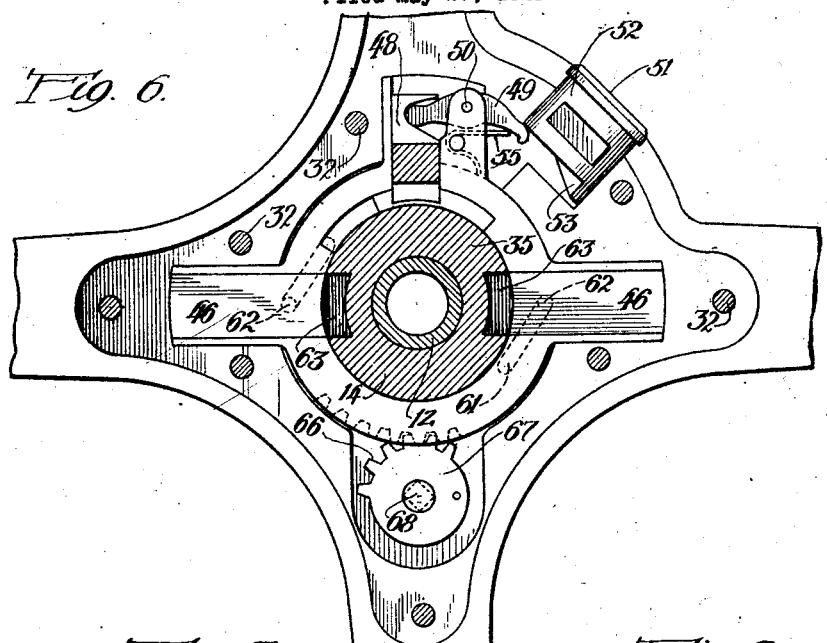
Fig. 6 is a view similar to Fig. 2, but showing the parts as related when moved to unlocking position.
Figure 7:
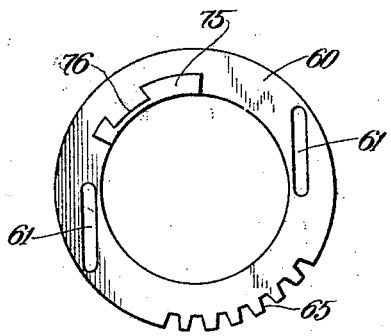
Figs. 7 and 8 are plan and side views, respectively, of the pinion ring.
Figure 8:
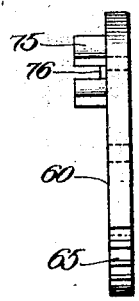
Figure 9:
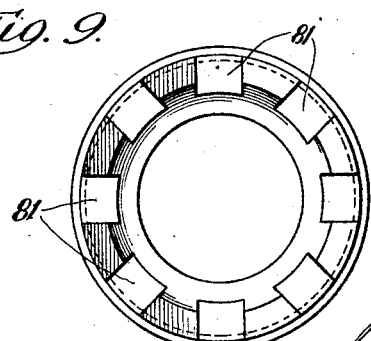
Fig. 9 is a bottom plan view of the cap nut.

Co-operating with the locking parts just described is a pinion ring 60 having parallel slots 61 arranged on diametrically opposite sides, each slot being extended from near its inner to its outer wall (see Figs. 6 and 7) to present in effect a cam. Within each of these slots is disposed a pin 62 that is carried by the proximate locking bolt 46, the relation being such that when the pinion ring is moved from the position shown in Fig. 2 to that which is indicated in Fig. 6, the locking bolts will be outwardly shifted in unison, thereby withdrawing from recesses 63 that are formed in opposite sides of the hub head. The means for revolving the pinion ring may comprise a plurality of teeth 65 with which mesh other teeth 66 formed on a controller 67 which is carried by a shaft 68 that extends through to the under side of the wheel where it is equipped with an operating finger piece 69 such as is shown in Fig. 3. As by means of a spring 70 whose opposite ends are connected to a fixed part of the wheel and to the controller 67, this latter part is normally caused to revolve in a direction which moves the pinion ring 60 to the position which is shown in Fig. 2 where it will be noted that the locking bolts are in engaging relation with the hub.

In order that the locking bolts when retracted from engaging position may be so held for an indefinite period, thus rendering the wheel inoperative, we have formed on the pinion ring an upstanding wall 75 within which is a recess 76 adapted to receive the acting end of the slide bolt 48. This wall 76 laps into the plane of the guide frame 44 and is adapted to move within an arc-shaped recess 77 that is formed on its inner periphery. When the recess 76 is aligned with the guideway 47, the slide bolt 48 may enter therein, but at other times the wall 75 is presented to the acting end of the slide bolt such as to hold the same retracted where it may not interfere with rotary movements of the pinion ring. A head 80 is further formed on the slide bolt which upstands adjacent the under side of the cap nut, and co-operating with this head are a plurality of radially disposed slots 81 formed on the under side of the cap nut around its periphery. When in advanced position the slide bolt may present its head within one of these slots 81 so as to prevent turning of the cap nut. From this construction it results that access to the parts interiorly of the wheel may not be gained through removal of the cap nut whenever the locking bolts are disengaged from the hub, or, in other words, whenever the wheel is inoperatively related to the steering post.

The operation of the parts heretofore described may be briefly summed up as follows: The single spring 70, working through the pinion ring 60, acts to move both locking bolts 46 to engaging position, and when the parts are so related they may not be disturbed except by turning the finger piece 69. When this part has been rotated, however, both locking bolts are withdrawn in unison from engagement with the hub, this being accomplished through the sliding of the pins 62 within the cam slots 61, and as an incident to this movement the recess 76 presents itself before the acting end of the slide bolt 48 which thereupon springs forward to prevent the parts from being returned to their previous positions. The wheel is now inoperative to control the steering apparatus. To restore the operativeness of the wheel, the proper key must be first applied to the lock 51 whose cam 53 may then be moved into engagement with the lever 49 to retract the slide bolt 48. As soon as this is withdrawn from the recess 76, the spring 70 acts upon the pinion ring 60 to return both locking bolts 46 to locking position within the hub recesses 65 whenever the wheel is revolved to the required position to permit this relationing of the parts.

It will be noted that the wheel chamber for the locking parts extends slightly within each of the spokes. To further protect the parts enclosed within the chamber so formed, we have shown hardened steel plates 85, 86 and 87 inserted respectively within the body of the wheel, the ring plate, and the cap nut, each disposed to frustrate access to the wheel interior through the use of some such tool as a drill, chisel, or the like. In the case of the insert plate 85 which is located on the under side of the wheel, it will be observed by reference to Fig. 2 that it is formed with walls 88 which provide an enclosure for the locking parts on every side but the top, the remaining inserts 86 and 87, which are carried in the ring plate and cap, supplementing the base plate 85 to afford complete protection. By means such as this, we have rendered the wheel lock secure against tampering of any kind.

It is desirable from the standpoint of manufacturing and assembling that a hub be secured to the steering post and that the wheel should lock to the hub, rather than to the post directly. The effect, however, is the same whether a hub be used, or whether the post be slotted to receive the ends of a clutch plate. It is to be considered that there is equivalency in such constructions, and the claims hereto appended are to be interpreted accordingly.

We claim:

1. In combination with a steering post, a wheel carried thereby, means for locking the wheel to the post comprising a pair of locking bolts on opposite sides of the wheel arranged to move toward and from the post to engage therewith, and means for withdrawing the locking bolts from engaging position comprising a member mounted for rotation co-axially of the wheel having a cam connection with each, substantially as described.

2. In combination with a steering post, a wheel carried thereby and formed centrally with a chamber which opens onto one side of the wheel, a hub arranged centrally of the wheel and adapted to be locked to the post, an annular head on the hub providing upper and lower shoulders, balls arranged on each shoulder, a retainer for the balls on each shoulder, a shoulder within the wheel chamber on which one ball retainer is rested, locking means carried by the wheel adapted to engage with the hub, a lock nut screwed to the post and overlying the hub, and a cap nut arranged to close the opening in the wheel side and to bear upon the ball retainer proximate thereto, the cap nut being adjustable to vary the degree of pressure upon said ball retainer, substantially as described.

3. In combination with a steering post, a wheel carried thereby and formed centrally with a chamber, locking elements within the chamber including a hub having a fixed attachment to the post, there being a notch on opposite sides of the hub, a circular frame surrounding the hub and formed to provide radial guideways which align with the recesses in the hub, a locking bolt slidably mounted in each guideway, a third guideway arranged intermediate the other two and extending radially from the circular frame, a slide bolt in the third guideway, a pinion ring arranged adjacent the guide frame, a cam connection between the pinion ring and each locking bolt such that the latter are moved in unison toward or from the hub with rotation of the pinion ring, manually operated means extending to the exterior of the wheel for rotating the pinion ring, means carried by the pinion ring and adapted to co-operate with the slide bolt when the locking bolts are withdrawn from the hub to prevent projection of the locking bolts, a spring acting to normally project the slide bolt into engagement with such means on the pinion ring, a key-controlled cam device operatively related to the slide bolt adapted to retract the same, and spring means acting to rotate the pinion ring to project the locking bolts toward the hub when the slide bolt is retracted, substantially as described.

4. In combination with a steering post, a wheel carried thereby and having a chamber formed centrally therein, the walls of the wheel surrounding the chamber being formed to provide a seat, a ring plate arranged in said seat, threads formed within the ring aperture, means for fixedly securing the ring plate to the wheel, means within the wheel chamber adapted to lock the wheel to the post, and a cap nut screwed into the ring plate to close the chamber within the wheel whereby the locking means therewithin are enclosed, substantially as described.

5. In combination with a steering post, a wheel carried thereby and formed with a central aperture which opens on one side thereof, a hub locked to the post and having an annular head with shoulders adjacent its upper and lower sides, means within the wheel co-operating with the lower shoulder to form an anti-friction connection therewith, means within the wheel chamber adapted to lock the wheel against rotation relative to the hub, a ring plate secured to the wheel upon its open side to partially close the same, means for securing said ring plate fixedly in position, a cap nut threaded into said ring plate, and an anti-friction connection between said cap nut and the upper shoulder of the hub, substantially as described.

6. In combination with a steering post, a wheel carried thereby and provided with a chamber centrally therewithin, means withing the wheel adapted to lock with the post, a manually operated device for unlocking the wheel from the post, and means for restoring said lock including a key-controlled element with which is associated a cam, a spring actuated lever, and a slide bolt whose movements in one direction are controlled by the lever spring and in the other direction by the counter action of the cam associated with the key-controlled device, substantially as described.

7. In combination with a steering post, a wheel carried thereby, means for locking the wheel to the post, comprising a pair of locking bolts on opposite sides of the wheel arranged to move toward and from the post to engage therewith, means for withdrawing the locking bolts from engaging position comprising a member mounted for rotation co-axially of the wheel and having a cam connection with each, and other means adapted to co-operate with the rotatable member to thereby hold the locking bolts against movement, substantially as described.

8. In combination with a steering post, a wheel carried thereby, means for locking the wheel to the post comprising a locking bolt arranged to move toward and from the post to engage therewith, a cam device mounted for rotation co-axially of the wheel and connected with the locking bolt adapted to move the same in either direction, a spring associated wtih the cam device normally acting to move the locking bolt in one direction, and manually operated means for moving the locking bolt against the tension of the spring, substantially as described.

9. In combination with a steering post, a wheel carried thereby, means for locking the wheel to the post comprising a locking bolt arranged to move toward and from the post to engage therewith, a slide bolt associated with the locking bolt for holding the latter in retracted position, and means for retracting the slide bolt comprising a spring actuated lever connected therewith and a key-controlled cam device operatively related to the lever, substantially as described.

10. In combination with a steering post, a wheel carried thereby, means for locking the wheel to the post comprising a locking bolt arranged to move toward and from the post to engage therewith, a cam device mounted for rotation co-axially of the wheel and for moving the locking bolt in one direction, and spring means working through the cam device for moving the locking bolt in the other direction, substantially as described.

11. In combination with a steering post, a spoked wheel carried thereby, there being a chamber formed centrally of the wheel and extending partially into the spokes thereof, and locking elements mounted within the wheel chamber, one of the walls of the wheel adjacent the chamber being cut away to provide thereinto an opening formed with a seat, and means for closing said opening comprising a ring plate secured in the seat and a cap nut screwed into the ring plate, substantially as described.

12. In combination with a steering post, a wheel carried thereby formed centrally with a chamber which is open on the upper wheel side in the center region thereof, locking means arranged within the wheel chamber adapted to engage with the post, means for shifting the locking means into engaging or disengaging position relative to the post, a cap screw-threaded into the opening in the upper wheel side to thereby protect the parts interiorly thereof, and a connection between the cap wheel and locking means such that the cap is locked against rotation when the locking means are disengaged from the post, substantially as described.

LEROY C. LAZEAR.
FRANK S. LAZEAR.